Figure 1:
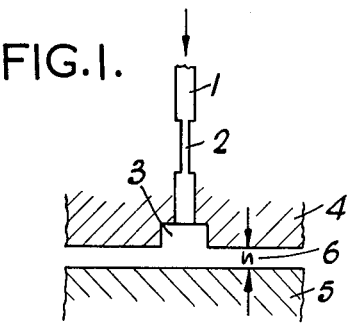

Nov. 6, 1962   J. K. ROYLE   3,062,593
HYDROSTATIC BEARING
Filed March 31, 1960

INVENTOR
JOSEPH K. ROYLE,

BY *Larson and Taylor*
ATTORNEYS

# United States Patent Office 3,062,593
Patented Nov. 6, 1962

3,062,593
HYDROSTATIC BEARING
Joseph Kenneth Royle, Stockport, England, assignor to National Research Development Corporation, London, England, a British corporation
Filed Mar. 31, 1960, Ser. No. 18,932
Claims priority, application Great Britain Apr. 2, 1959
3 Claims. (Cl. 308—9)

This invention relates to fluid bearings of the type in which a load carrying member is carried on a support with a film of fluid maintaining a small clearance space between them. The fluid is fed to the clearance space from a pressure supply, the fluid exhausting through the said clearance space. The fluid is usually fed to the clearance space via a restrictor or resistance. The exhaust passage for the fluid through the clearance space also acts as a resistance to the flow of the fluid and the clearance between the two members tends to vary according to the load on the load carrying member.

In many applications (particularly in the case of machine tools and the like) the variation in clearance between the two members due to variation in loading cannot be tolerated and it is an object of the invention to maintain this clearance common irrespective of load variations. Furthermore, on certain weighing machines or balances it is necessary to measure load without deflection of the load carrying member.

According to the invention there is provided a fluid bearing comprising two co-operating members having adjacent surfaces defining a clearance space between them, means for introducing fluid under pressure into the clearance space, the fluid flowing through the said clearance space, the clearance space having a resistance to the flow of fluid therethrough, a restriction in the path of the fluid between a supply point and the clearance space, such restriction offering resistance to the flow of fluid through it, means for measuring the variation in resistance to flow of fluid through the clearance space and means responsive to the said variation in resistance to vary the pressure of the fluid at the supply point in a sense such as to tend to maintain the clearance space, and thus the resistance to flow of fluid therethrough, substantially constant.

When the bearing is in equilibrium with the clearance space at its predetermined value, the ratio of the fluid pressures either side of the restriction has a unique value irrespective of the actual pressures. Any variation in the clearance space, and thus its resistance to flow of fluid therethrough will affect the pressures both sides of the restriction to cause the ratio of the pressures to vary from the unique value and by using these pressure variations to operate a valve which controls the pressure at the supply point, the pressure ratio can be caused to return to the unique value but at a different supply pressure, and thus cause the clearance space to return to its predetermined value. According to a further feature of the invention there is provided a fluid bearing comprising two co-operating members having adjacent surfaces defining a clearance space between them, means for introducing fluid under pressure into the clearance, the fluid exhausting through said clearance, a restriction in the path of the fluid between a supply point and the clearance space, such restriction offering resistance to the flow of the fluid through it, means for sensing the fluid pressure at a predetermined position in the path of the fluid between the restriction and the clearance space, means for sensing the fluid pressure at a predetermined position in the path of the fluid between the supply point and the restriction and means responsive to the two pressures so sensed to vary the pressure of the fluid at the supply point in a sense such as to maintain substantially constant the ratio between the sensed pressures whereby the distance between the said adjacent surfaces is maintained substantially constant.

Figure 2:
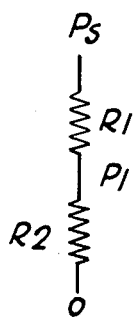
Figure 3:
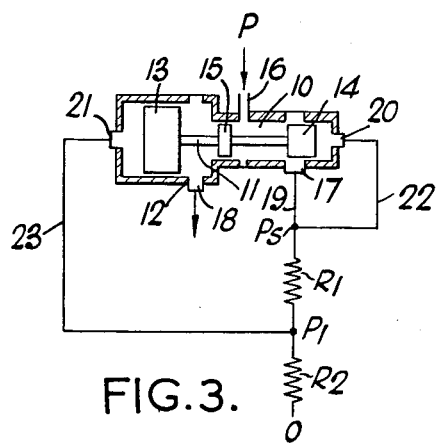
Figure 5:
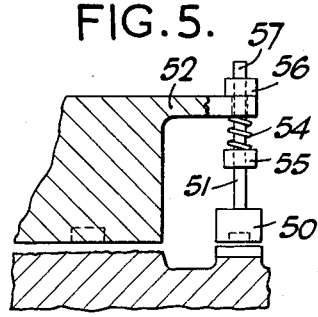
Figure 4:
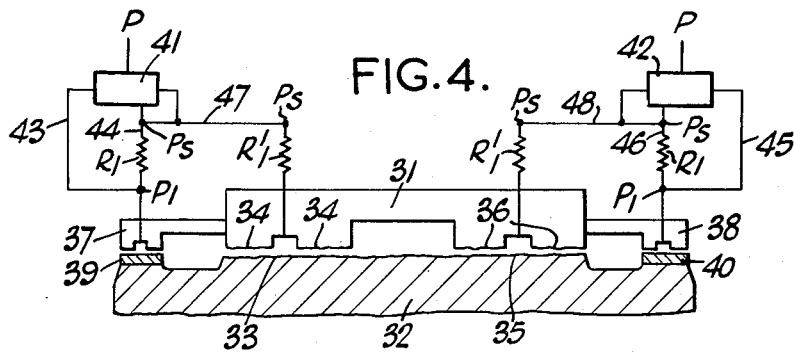

The invention will be more easily understood from the following description of certain embodiments thereof, suitable for use with machine tool slides, illustrated in the drawings accompanying the provisional specification in which:

FIGURE 1 is a diagrammatical drawing of a conventional bearing;
FIGURE 2 is a diagrammatical circuit representing the elements of FIGURE 1;
FIGURE 3 is a diagrammatical drawing of one embodiment of the invention;
FIGURE 4 is a diagrammatical drawing of another embodiment of the invention; and
FIGURE 5 is a diagrammatical drawing of a modification of the embodiment illusrated in FIGURE 4.

In one form of a conventional bearing, fluid at a predetermined pressure is supplied by pipe 1 through a resistance 2 to an outlet 3 formed in bearing member 4. The bearing member 4 co-operates with a further bearing member 5, and when in operation the two members are separated by a clearance 6, of dimension $h$. This clearance is maintained by the flow of fluid through it under the effect of the pressure at the outlet 3. The dimension $h$ of the clearance varies with variation of the load imposed on the bearing, the clearance thus providing an exhaust for the fluid in the form of a varying resistance.

The system of FIGURE 1 can be readily redrawn as illustrated in FIGURE 2. $P_s$ is the pressure of the fluid supply to the pipe 1 of FIGURE 1, $R_1$ being the resistance 2, $P_1$ the pressure of the fluid at the outlet 3 and $R_2$ the resistance of the exhaust through clearance 6. Where, as is normal, the exhaust is to atmosphere, the final pressure is 0 as shown. In operation, variation of the load imposed on the bearing varies the resistance $R_2$ due to the clearance varying. The variation of $R_2$ causes variation of the pressure $P_1$ and $P_1$ and $R_2$ will eventually settle at some new value at which $P_1$ can support the new load. The maintenance of a substantially constant clearance means, of course, that $$\frac{R_2}{R_1}$$

is constant. For viscous type flows, $$\frac{R_2}{R_1}$$

constant implies that $$\frac{P_1}{P_s}$$

shall also be constant. As $P_1$ may vary according to the load applied to the bearing, $P_s$ must also vary.

FIGURE 3 shows diagrammatically one form of apparatus for obtaining the necessary variation of $P_s$ in a manner which will maintain $$\frac{R_2}{R_1}$$

constant. A clearance and thus a value for $R_2$ is first chosen, resistance $R_1$ then being made to have a value such that $P_1$ is some proportion of $P_s$. This value can be selected to suit requirements as values between approximately .3 $P_s$ and approximately .7 $P_s$ have been found quite suitable. In the present example $P_1$ is taken as $$\frac{P_s}{2}$$

$P_s$ will then vary up to a maximum value which is twice the maximum value of $P_1$ required to support the heaviest load on the bearing. A fluid supply, which is at a pressure P at least equal to the maximum of $P_s$ is fed to a valve indicated generally at 10. The valve 10 comprises a compound piston valve spool 11 moving endwise in a closed valve body 12. The valve spool has three pistons 13, 14 and 15 formed on it, one at each end and one at an intermediate, approximately central, position. Piston 13, at one end, has an area twice that of the piston 14 at the other. The intermediate piston 15 has an area the same as that of piston 14. The valve body 12 is suitably shaped, as shown, to provide a portion with a larger diameter for the piston 13, and a portion with a smaller diameter for the pistons 14 and 15. Formed in the wall of the valve body between the pistons 14 and 15 is an inlet 16 and an outlet 17 positioned so that the inlet is completely open at all times and the outlet completely open when the piston 14 is farthest away from the inlet 16 and fully closed when the piston 14 is in a position where it has moved nearest to the inlet 16. Formed in the wall of the valve body at a position intermediate the pistons 13 and 15 is an outlet 18. This outlet is always fully open and acts as a vent. The fluid is fed from the valve via outlet 17 through pipe 19 and resistance $R_1$ to an outlet into the bearings, where it is at a pressure $P_1$ and then exhausting through the bearing clearance which is represented by resistance $R_2$. Formed in the ends of the valve body are two further inlets 20 and 21. Inlet 20, in the end of the valve body containing piston 14 is connected to pipe 19 by pipe 22. Inlet 21 in the end of the valve body containing the piston 13, is connected to the fluid outlet into the bearing by pipe 23. Thus the outlet pressure $P_s$ from the valve is balanced on the valve spool 11 by the pressure $P_1$ at the bearing. As the area of piston 13 is twice that of the piston 14, $P_s$ must be twice $P_1$ for the valve to be in equilibrium. If the load on the bearing varies, for example increases, the resistance $R_2$ will be increased causing an increase in the pressure $P_1$. This increased pressure will act via pipe 23 and inlet 21 on piston 13, moving it to the right, as drawn in FIGURE 3. This movement will cause piston 14 to increase the opening of outlet 17 and will thus increase the pressure in pipe 19. This increased pressure is fed both through the resistance $R_1$ to the bearing and via pipe 22 to the inlet 20. The valve spool will eventually settle to a new position where the pressure $P_s$ is of a value so that $P_1$ is sufficient to maintain the clearance, and thus resistance $R_2$, at its original value with the increased load. A decrease in load on the bearing will cause the valve to operate in a reverse manner. It will thus be seen that the clearance of the bearing can be maintained substantially constant, independent of the load.

FIGURE 4 illustrates the application of the invention to a machine tool such as for instance a lathe, milling machine, profile checking machine etc., where a member 31 slides upon another member 32. In these machines the opposing faces 33, 34, 35 and 36 normally have to be finished to very fine limits of smoothness and flatness. This can be extremely difficult and expensive especially for large machines. However in the apparatus shown, auxiliary bearing pads 37 and 38 are rigidly mounted on either side of the member 31 and co-operate with accurately finished plates 39 and 40 fastened to the member 32. The auxiliary bearings 37, 39 and 38, 40 are connected respectively to valves 41 and 42 via resistance $R_1$ and pipes 43, 44, 45 and 46 as shown. The valves 41 and 42 are of the same form as valve 10 in FIGURE 3 and the auxiliary bearing clearances are controlled exactly as in FIGURE 3. A further pipe 47 connects pipe 44 from valve 41 through resistance $R'_1$ to one main bearing formed by faces 33 and 34 and a pipe 48 connects pipe 46 from valve 42 through a similar resistance $R'_1$ to another main bearing formed by faces 35 and 36. The faces 33, 34, 35 and 36 do not need to be so accurately finishd as is normally the case. If, due to inaccuracies of the faces, the clearance increases, the load on the machine would normally tend to move the member 31 down until the clearance was back to the original level, causing inaccuracies in machining or measuring. However, this movement down also occurs with members 37 and 38 and decreases the clearances between these members and the flat plates 39 and 40. This would cause operation of the valves 41 and 42, as described in relation to FIGURE 3, so as to increase the pressure $P_s$, which is fed to both the main bearings and the auxiliary bearings so as to return the member 31 to its correct level, and to restore the clearances of the auxiliary bearings to their original value. Variation of clearances due to load fluctuations will cause operation of the valves as described above in relation to FIGURE 3.

In apparatus as illustrated in FIGURE 4, it is quite probable that the clearances of the main bearings would be larger than those of the auxiliary bearings, it is desirable that some safeguard should be provided to prevent damage occurring due to a sudden load increase or failure of the pressure fluid supply. Such a safeguard is illustrated in FIGURE 5. The auxiliary pad 50 is mounted on a rod 51 which is slidably supported in an arm 52 extending from the machine member 53. The pad is normally held down in its operating position by a spring 54 bearing against the arm 52 and a collar 55 fastened to the rod 51. A stop 56 locates the pad in its correct position. The fluid supply to the auxiliary bearing is fed via the pipe 57. Should a downward movement of the machine occur which is in excess of the clearance of the auxiliary bearing, then when the pad 50 contacts its plate, the spring will allow further downward movement of the machine member without overloading the auxiliary bearing.

In a machine tool or other apparatus with longitudinal sliding bearings, it will be necessary to have two such bearing pads on one side of the slide, and a single pad of this type on the other side. In machines having circular slide ways, such as dividing head, sighting instruments etc., it is necessary to have three such bearing pads spaced substantially equidistant around the machine. Although shown and described as acting in a horizontal plane the bearing pads will act just as efficiently in a vertical plane to control sideways clearance of one member relative to another. Additional uncontrolled conventional bearing pads could also be provided to increase the load carrying capacity.

I claim:

1. Fluid bearing means comprising a main load carrying bearing and a pilot bearing, each of said main load carrying and pilot bearings comprising a first and a second co-operating member having adjacent surfaces defining a clearance space, the first member of each of said bearings being coupled in a predetermined positional relationship, means for introducing fluid under pressure into each clearance space from a common supply point, a first restriction in the path of the fluid between the supply point and the clearance space of the pilot bearing, a second restriction in the path of the fluid between the supply point and the clearance space of the main load carrying bearing, each restriction offering resistance to the flow of fluid through it, means for tapping the fluid pressure at a point in the path of the fluid between the first restriction and the clearance space of the pilot bearing, means for tapping the fluid pressure at a point in the path of the fluid between the supply point and the first restriction and means responsive to the pressures so tapped to vary the pressure of the fluid at the supply point in a sense such as to tend to maintain the clearance space of the pilot bearing substantially constant whereby the position of the first member of the main load carrying bearing relative to the second member of the pilot bearing remains substantially constant, irrespective of variation of the clearance space of the main load carrying bearing.

2. Fluid bearing means as claimed in claim 1 in which the coupling holding together the first member of each of said bearings comprises resilient means operative to urge the first member of the pilot bearing to its predetermined positioned relationship with the first member of the main load carrying bearing, the resilient means being readily deflected upon contact between the first and second members of the pilot bearing, whereby overloading of the pilot bearing is avoided.

3. A fluid bearing comprising two cooperating members having adjacent surfaces defining a clearance space between them, means for introducing fluid under pressure into the clearance space, the fluid flowing through the clearance space, the clearance space offering a resistance to the flow of fluid therethrough, a restriction in the path of the fluid between a supply point and the clearance space, such restriction offering resistance to the flow of fluid therethrough, means for tapping the fluid pressure at a point between the restriction and the clearance space, means for tapping the fluid pressure at a point between the restriction and the supply point, and a control device comprising a piston, two opposed faces of said piston having different areas, said two opposed faces being exposed one to each of the two tapped pressures, said control device being operative so as variably to obstruct the path of the fluid between the supply point and the clearance space, whereby to maintain the ratio of said tapped pressures equal to the inverse of the ratio of the areas of said two opposed faces exposed to said tapped pressures.

References Cited in the file of this patent

UNITED STATES PATENTS 2,879,113     DeHart ---------------- Mar. 24, 1959
2,981,572     Kuhne ----------------- Apr. 25, 1961

OTHER REFERENCES

Air Lubricated Bearings, published in 1953, Annual Handbook, Product Engineering, pages J2 through J5 relied upon.